US008162745B2

(12) United States Patent
Jaffe et al.

(10) Patent No.: US 8,162,745 B2
(45) Date of Patent: Apr. 24, 2012

(54) WAGERING GAME WITH EPISODIC FEATURE DETERMINED BY PLAYER

(75) Inventors: Joel R. Jaffe, Glenview, IL (US); Jamie Vann, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 432 days.

(21) Appl. No.: 12/513,339

(22) PCT Filed: Oct. 30, 2007

(86) PCT No.: PCT/US2007/022852
§ 371 (c)(1), (2), (4) Date: May 1, 2009

(87) PCT Pub. No.: WO2008/057323
PCT Pub. Date: May 15, 2008

(65) Prior Publication Data

US 2010/0016063 A1 Jan. 21, 2010

Related U.S. Application Data

(60) Provisional application No. 60/586,110, filed on Nov. 2, 2006.

(51) Int. Cl.
*A63F 13/10* (2006.01)

(52) U.S. Cl. .......................................... 463/20; 463/23

(58) Field of Classification Search .................... 463/20, 463/2, 23, 53; 273/440.1, 441
See application file for complete search history.

(56) References Cited

U.S. PATENT DOCUMENTS

| | | | | |
|---|---|---|---|---|
| 4,752,068 | A | 6/1988 | Endo | 273/1 |
| 5,575,474 | A | 11/1996 | Rossides | 463/26 |
| 5,609,525 | A | 3/1997 | Ohno et al. | 463/43 |
| 5,833,537 | A | 11/1998 | Barrie | 463/21 |
| 5,957,775 | A | 9/1999 | Cherry | 463/16 |
| 6,004,211 | A | 12/1999 | Brenner et al. | 463/40 |
| 6,012,045 | A | 1/2000 | Barzilai | 705/37 |
| 6,012,983 | A | 1/2000 | Walker et al. | 463/20 |
| 6,015,344 | A | 1/2000 | Kelly et al. | 463/16 |
| 6,068,553 | A | 5/2000 | Parker | 463/27 |
| 6,077,163 | A | 6/2000 | Walker et al. | 463/26 |

(Continued)

FOREIGN PATENT DOCUMENTS

WO WO 99/29381 6/1999

(Continued)

OTHER PUBLICATIONS

PCT International Search Report for International Application No. PCT/US/2007/022852 dated Apr. 7, 2008 (2 pages).

(Continued)

*Primary Examiner* — William D Coleman
*Assistant Examiner* — Christine Enad
(74) *Attorney, Agent, or Firm* — Nixon Peabody LLP

(57) ABSTRACT

A gaming machine for playing a wagering game includes a game display and a controller. The game display is operable to display a randomly selected outcome of a wagering game in response to receiving a wager from a player. The wagering game has a game-play progression that includes a plurality of game episodes, at least one of the plurality of game episodes having a plurality of episode features. The controller is in communication with the game display and is programmable to cause, in response to a manual selection received from the player, the start of the wagering game from any previously played feature of the plurality of episode features.

20 Claims, 6 Drawing Sheets

U.S. PATENT DOCUMENTS

| | | | | |
|---|---|---|---|---|
| 6,113,098 | A | 9/2000 | Adams | 273/143 R |
| 6,165,071 | A | 12/2000 | Weiss | 463/24 |
| 6,234,896 | B1 | 5/2001 | Walker et al. | 463/16 |
| 6,254,481 | B1 | 7/2001 | Jaffe | 463/20 |
| 6,273,820 | B1 | 8/2001 | Haste, III | 463/40 |
| 6,287,194 | B1 | 9/2001 | Okada et al. | 463/16 |
| 6,302,790 | B1 | 10/2001 | Brossard | 463/20 |
| 6,311,976 | B1 | 11/2001 | Yoseloff et al. | 273/138 |
| 6,319,127 | B1 | 11/2001 | Walker et al. | 463/26 |
| 6,364,765 | B1 | 4/2002 | Walker et al. | 463/16 |
| 6,364,766 | B1 | 4/2002 | Anderson et al. | 463/16 |
| 6,431,983 | B2 | 8/2002 | Acres | 463/25 |
| 6,506,117 | B2 | 1/2003 | DeMar | 463/20 |
| 6,506,118 | B1 | 1/2003 | Baerlocher et al. | 463/25 |
| 6,663,489 | B2 | 12/2003 | Baerlocher | 463/20 |
| 6,722,981 | B2 | 4/2004 | Kaminkow | 463/20 |
| 6,722,985 | B2 | 4/2004 | Criss-Puszkiewicz et al. | 463/29 |
| 6,745,236 | B1 | 6/2004 | Hawkins et al. | 709/203 |
| 6,758,757 | B2 | 7/2004 | Luciano, Jr. et al. | 463/43 |
| 6,776,713 | B2 | 8/2004 | Gauselmann | 463/16 |
| 6,780,111 | B2 | 8/2004 | Cannon et al. | 463/25 |
| 6,800,027 | B2 | 10/2004 | Giobbi et al. | 463/24 |
| 6,811,486 | B1 | 11/2004 | Luciano, Jr. | 463/24 |
| 6,923,721 | B2 | 8/2005 | Luciano et al. | 463/24 |
| 7,182,690 | B2 | 2/2007 | Giobbi et al. | 463/24 |
| 2001/0024971 | A1 | 9/2001 | Brossard | 463/30 |
| 2001/0046893 | A1 | 11/2001 | Giobbi et al. | 463/24 |
| 2002/0028708 | A1 | 3/2002 | Busch et al. | 463/42 |
| 2002/0039919 | A1 | 4/2002 | Joshi et al. | 463/20 |
| 2002/0077173 | A1 | 6/2002 | Luciano Jr. et al. | 463/23 |
| 2002/0077174 | A1 | 6/2002 | Luciano et al. | 463/25 |
| 2002/0093136 | A1 | 7/2002 | Moody | 273/139 |
| 2002/0094871 | A1 | 7/2002 | Luciano, Jr. et al. | 463/43 |
| 2002/0107065 | A1 | 8/2002 | Rowe | 463/157 |
| 2002/0151349 | A1 | 10/2002 | Joshi | 463/20 |
| 2002/0196342 | A1 | 12/2002 | Walker et al. | 348/157 |
| 2003/0013515 | A1 | 1/2003 | Rowe et al. | 463/25 |
| 2003/0013531 | A1 | 1/2003 | Rowe et al. | 463/42 |
| 2003/0036422 | A1 | 2/2003 | Baerlocher et al. | 463/20 |
| 2003/0036427 | A1 | 2/2003 | Brandstetter et al. | 463/29 |
| 2003/0064794 | A1 | 4/2003 | Mead et al. | 463/25 |
| 2003/0078101 | A1 | 4/2003 | Schneider et al. | 463/42 |
| 2003/0100362 | A1 | 5/2003 | Horniak et al. | 463/25 |
| 2003/0106769 | A1 | 6/2003 | Weiss | 194/201 |
| 2003/0114219 | A1 | 6/2003 | McClintic | 463/25 |
| 2003/0114220 | A1* | 6/2003 | McClintic | 463/25 |
| 2003/0119579 | A1 | 6/2003 | Walker et al. | 463/20 |
| 2003/0153379 | A1* | 8/2003 | Beaulieu | 463/16 |
| 2003/0157979 | A1 | 8/2003 | Cannon et al. | 463/16 |
| 2003/0195024 | A1 | 10/2003 | Slattery | 463/9 |
| 2003/0211881 | A1 | 11/2003 | Walker et al. | 463/20 |
| 2004/0053680 | A1 | 3/2004 | Schultz | 463/20 |
| 2004/0142742 | A1 | 7/2004 | Schneider et al. | 463/25 |
| 2004/0209662 | A1 | 10/2004 | Wadleigh | 463/16 |
| 2005/0003886 | A1 | 1/2005 | Englman et al. | 463/25 |
| 2005/0159207 | A1 | 7/2005 | Thomas | 463/20 |
| 2006/0068893 | A1 | 3/2006 | Jaffe et al. | 463/20 |
| 2006/0079316 | A1 | 4/2006 | Flemming et al. | 463/25 |
| 2006/0079317 | A1 | 4/2006 | Flemming et al. | 463/25 |
| 2006/0084495 | A1 | 4/2006 | Jaffe et al. | 463/20 |
| 2006/0084496 | A1 | 4/2006 | Jaffe et al. | 463/20 |
| 2006/0089194 | A1 | 4/2006 | Joshi et al. | 463/25 |
| 2007/0254734 | A1 | 11/2007 | Gilmore et al. | 463/20 |
| 2007/0259706 | A1 | 11/2007 | Anderson et al. | 463/16 |
| 2007/0259713 | A1 | 11/2007 | Fiden et al. | 463/25 |
| 2007/0265060 | A1 | 11/2007 | Hornik et al. | 463/20 |
| 2007/0298856 | A1 | 12/2007 | Gilmore et al. | 463/16 |
| 2008/0113770 | A1 | 5/2008 | Gelber et al. | 463/25 |

FOREIGN PATENT DOCUMENTS

| | | | |
|---|---|---|---|
| WO | WO 2005/082480 | A1 | 9/2005 |
| WO | WO 2006/002241 | A2 | 1/2006 |
| WO | WO 2006/004831 | A2 | 1/2006 |
| WO | WO 2006/004832 | A2 | 1/2006 |
| WO | WO 2006/005073 | A2 | 1/2006 |
| WO | WO 2006/017036 | A1 | 2/2006 |
| WO | WO 2006/017067 | A1 | 2/2006 |
| WO | WO 2006/017068 | A1 | 2/2006 |
| WO | WO 2006/020811 | A2 | 2/2006 |
| WO | WO 2006017068 | A1 * | 2/2006 |
| WO | WO 2006/026250 | A2 | 3/2006 |
| WO | WO 2006/044252 | A2 | 4/2006 |
| WO | WO 2007/103054 | A2 | 9/2007 |
| WO | WO 2008/048634 | A2 | 4/2008 |

OTHER PUBLICATIONS

PCT International Written Opinion for International Application No. PCT/US2007/022852 dated Apr. 7, 2008 (5 pages).

* cited by examiner

WAGERING GAME WITH EPISODIC FEATURE DETERMINED BY PLAYER

CROSS REFERENCE TO RELATED APPLICATIONS

This application is a U.S. national stage of International Application No. PCT/US2007/022852, filed Oct. 30, 2007, which is related to and claims priority to U.S. Provisional Application No. 60/856,110, filed Nov. 2, 2006, which is incorporated herein its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a method for selecting a start point for playing a portion of a wagering game episode.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

One type of wagering game is an episodic wagering game in which the game play progresses through a plurality of game episodes. One disadvantage with some current episodic wagering games is that they require the player to play through each portion of the episodes until the game is completed. For entertainment or other reasons, the player may wish to replay a particular portion of the episodic wagering game to receive a higher award or a higher number of points than previously received. For example, the player may wish to replay a previously played portion hoping that he or she will receive a more favorable outcome (e.g., a larger award or a higher number of points). Thus, the player is likely to become frustrated and annoyed because he or she cannot manually select to replay any previously played portion of the episodic wagering game.

Accordingly, a need exists for a wagering game in which the player can manually select a starting point of any previously played portion of the wagering game. The present invention is directed to satisfying one or more of these needs and solving other problems.

SUMMARY OF THE INVENTION

According to one aspect of the present invention, a gaming machine for playing a wagering game includes a game display and a controller. The game display is operable to display a randomly selected outcome of a wagering game in response to receiving a wager from a player. The wagering game has a game-play progression that includes a plurality of game episodes, at least one of the plurality of game episodes having a plurality of episode features. The controller is in communication with the game display and is programmable to cause, in response to a manual selection received from the player, the start of the wagering game from any previously played feature of the plurality of episode features.

According to another aspect of the invention, a method of conducting a wagering game includes receiving a wager input from a player for playing a wagering game having a game-play progression that includes a plurality of game episodes. The method further includes selecting at least one randomly selected outcome of a plurality of outcomes in response to the receiving step. A game episode of the plurality of game episodes is completed in response to completing all episode features of the game episode. The player is provided with a selectable start point for playing the wagering game, the start point being selectable from any episode feature of a prior completed game episode of the plurality of game episodes.

According to yet another aspect of the invention, a computer readable storage medium is encoded with instructions for directing a gaming system to perform the above method.

According to yet another aspect of the invention, a method for playing a wagering game includes receiving a wager input from a player for playing a wagering game having an episodic game-play progression. At least one randomly selected outcome of a plurality of outcomes is selected in response to receiving the wager input. An initial Basegame Feature of a game episode is played and, in response to playing one or more subsequent missions of the game episode, completing the game episode. A selectable gameplay start point is provided in response to completing the game episode, the start point being selected from any Basegame Feature of the game episode, which includes the initial Basegame Feature and the one or more subsequent missions.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
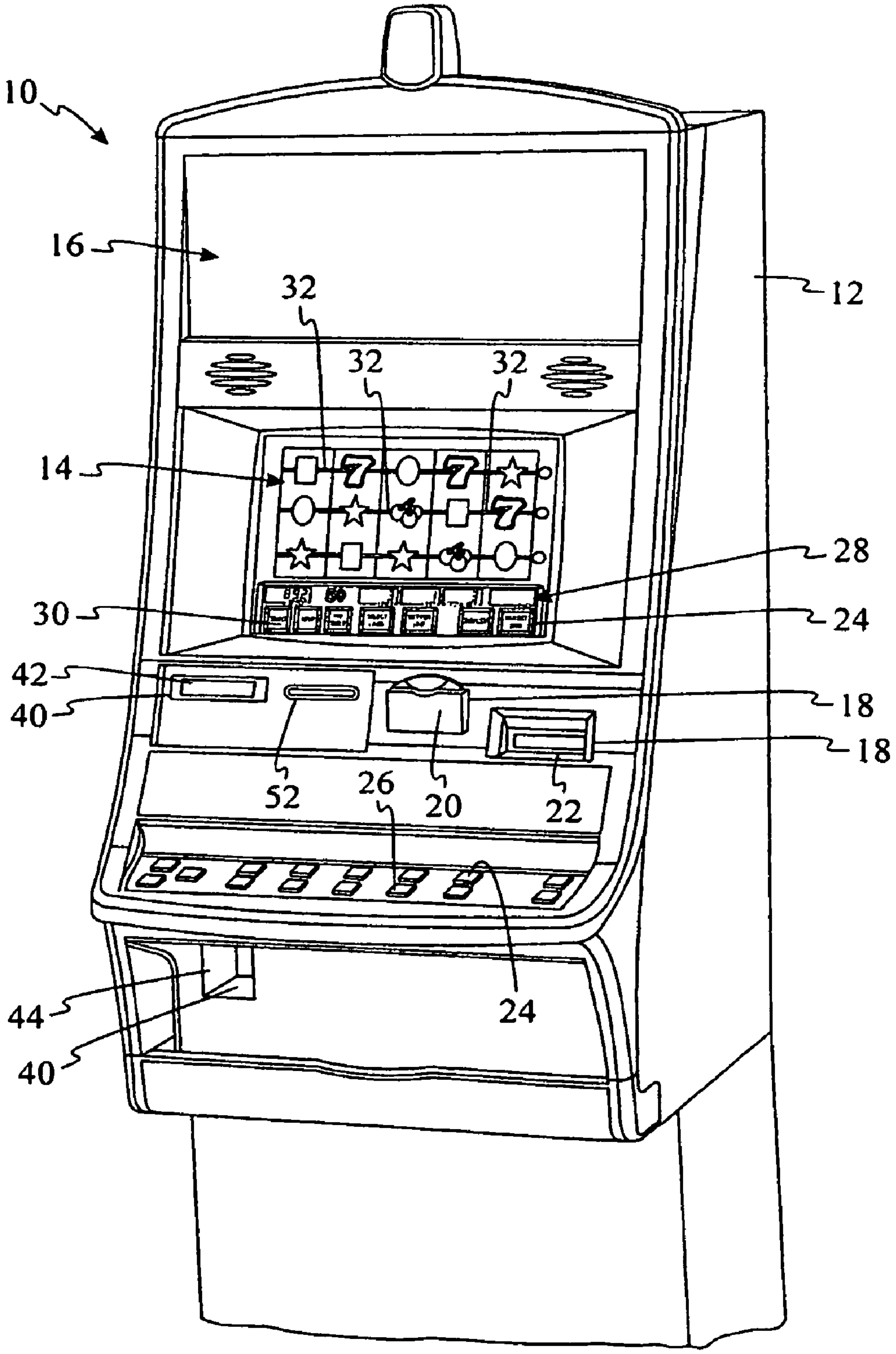
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
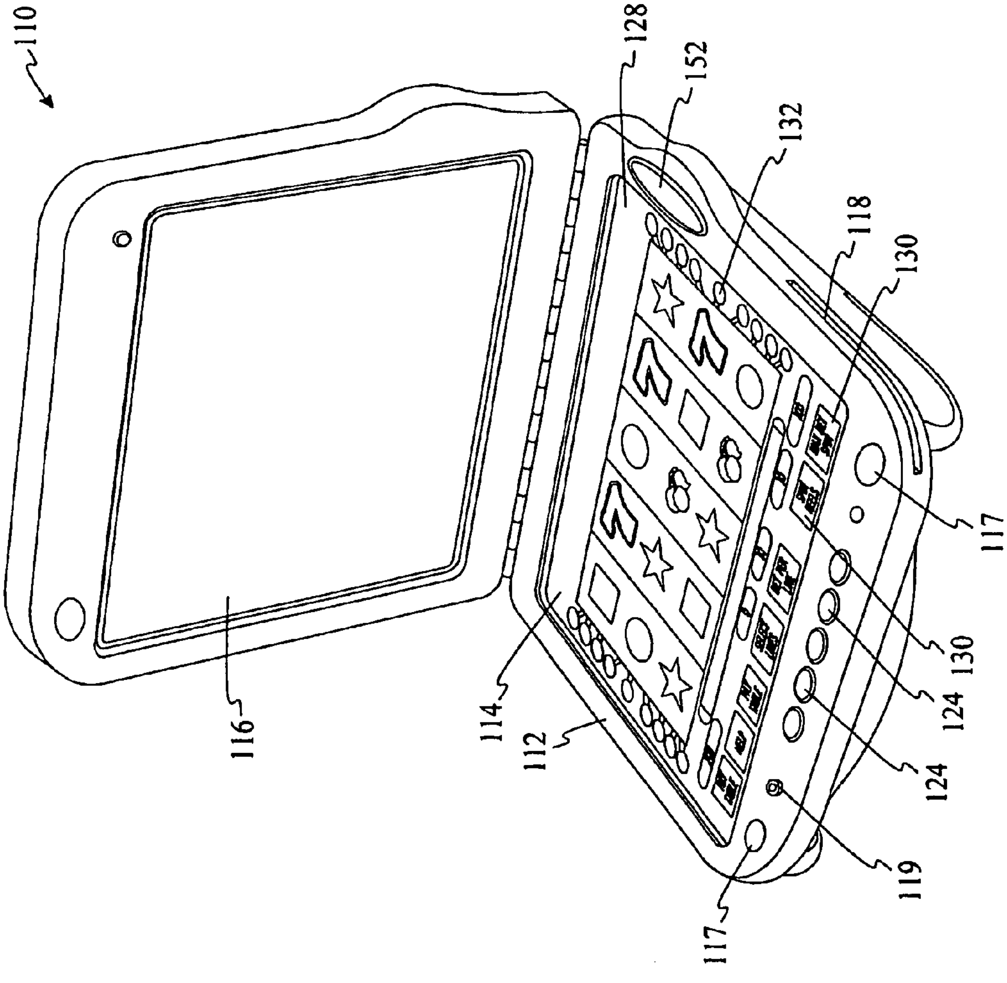
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110.

The size of the primary display 114 may vary from, for example, about a 2"-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
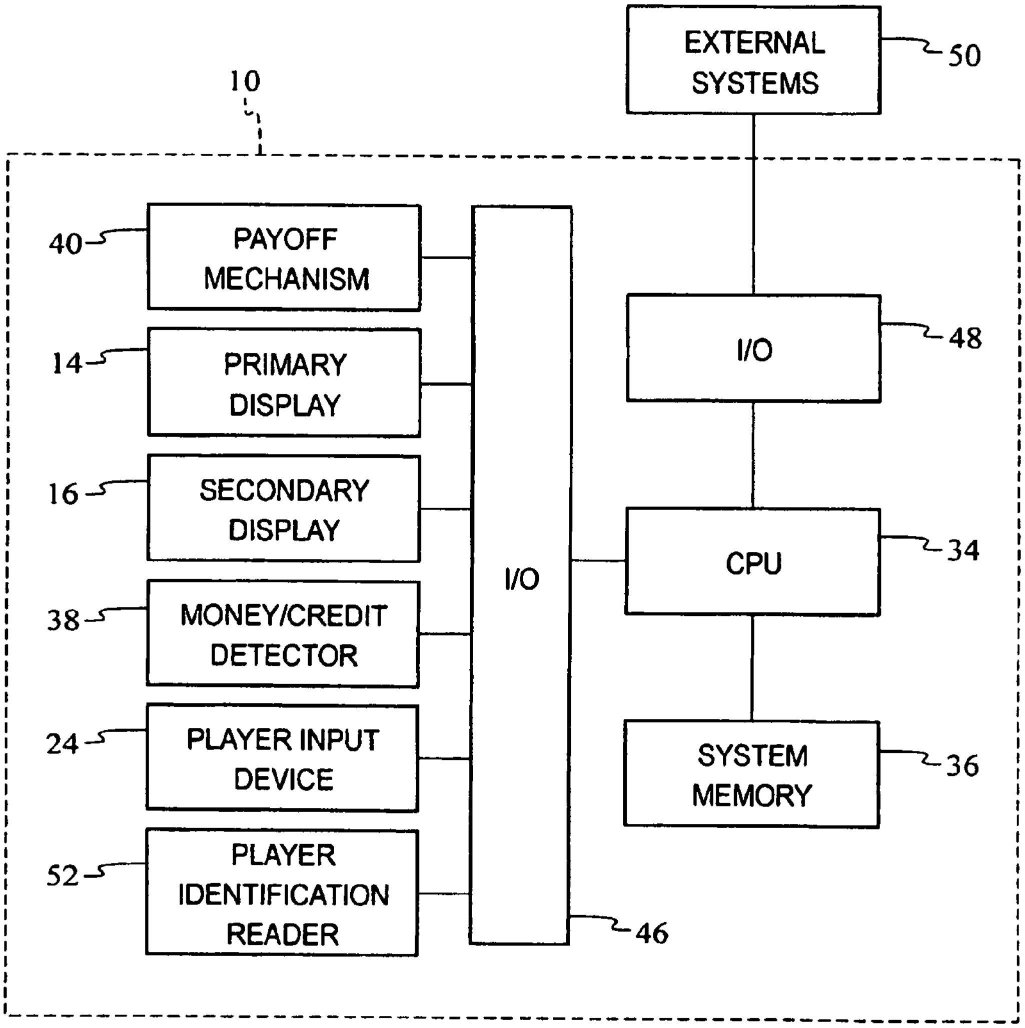
FIG. 2 is a block diagram of a control system suitable for operating the gaming machines of FIGS. 1*a* and 1*b*.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

The wagering game played on the gaming machine 10, 110 is conducted in accordance with basic gaming rules that are familiar to a typical player. For example, the player may play a slots game in which the basic gaming rules provide a slots game that is played via five spinning reels. The player may conduct a slots game in which the randomly selected outcome is indicated via a plurality of predetermined symbols, such as cherry, lemon, orange, apple, and banana symbols. The player may conduct a slots game in which winning combinations are indicated to the player in a paytable, and in which the player can select a maximum of ten left-to-right paylines. Thus, before playing the slots game, the player has a general expectancy that the slots game will be played according to the respective set of basic gaming rules.

Figure 3:
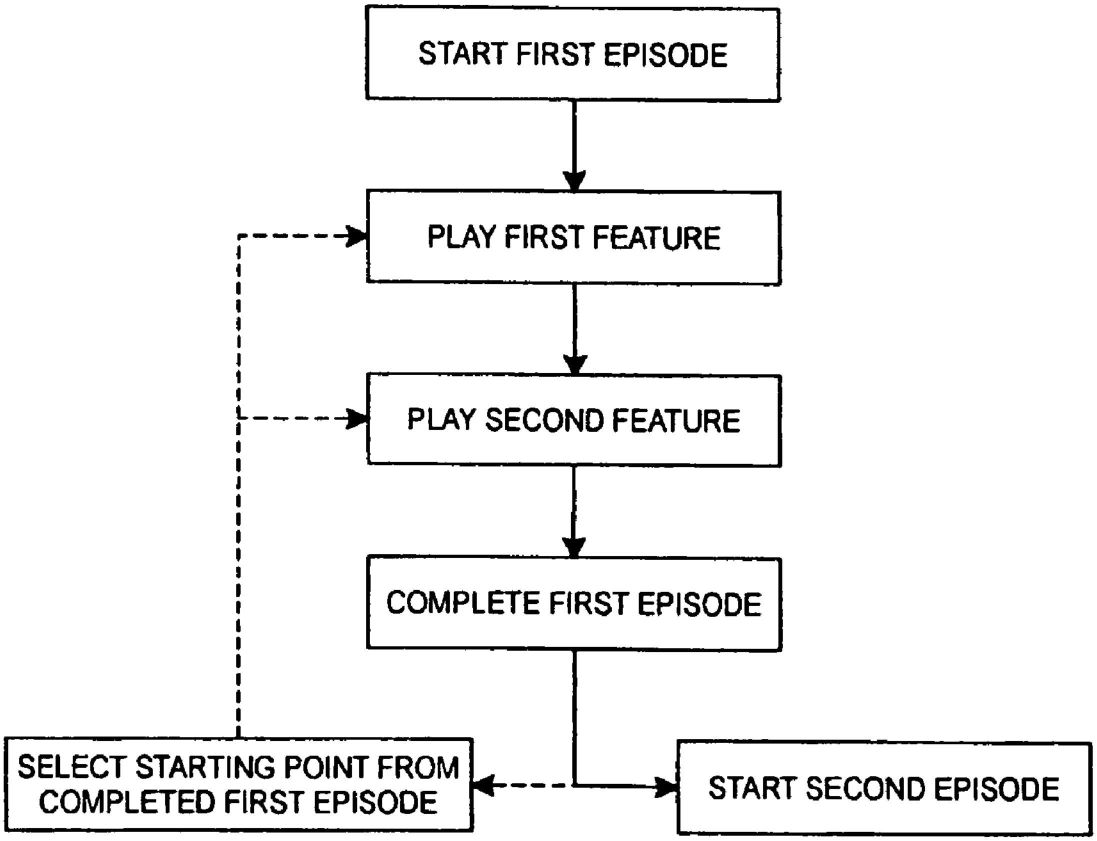
FIG. 3 is a general schematic representation of conducting an episodic wagering game, according to an embodiment of the invention.

Referring to FIG. 3, a player conducts an episodic wagering game in which the player can select a particular game-play start point after completing a first episode. Episodic game play can provide a fun experience, loyalty, and replayability when a player explores episodes of the wagering game. Generally, a game episode can be described as a distinct game-play portion (e.g., a plurality of spins of the reels) of a wagering game that begins when a start-episode event is triggered and ends when an end-episode condition is reached. For example a start-episode event can be receiving a wager input from the player and selecting a start point of the respective game episode. An end-episode condition can occur, for example, when a wagering session is terminated (e.g., cashing-out) or when all game play requirements associated with the respective game episode are fulfilled.

The game episode is part of a game-play progression that includes a plurality of game episodes, wherein an end of an episode generally triggers the beginning of another episode. Generally, the game-play progression is linear, such as when the player is required to complete a first episode before being able to play a second episode (in contrast to being able to play a third episode). Alternatively, the game-play progression can be non-linear (i.e., after completing a first episode the player is able to play any of a second episode or a third episode).

At least one of the game episodes includes a plurality of game features, also referred to as missions. The game features can include basic games and/or bonus games. For example, a game feature can be a reel spin in which one or more game-enhancement parameters are applied to the reels (e.g., wild reels, spin multipliers, multiplying wilds, wild symbols, etc.). To complete a particular game episode, the player plays one or more of the game features. Optionally, the player is required to play all the game features of a respective game episode before completing the game episode.

The player starts playing the first episode and, sequentially, plays a first feature and a second feature of the first episode. After completing the first episode, the player is provided with an option to select a starting point from the completed first episode. Accordingly, the player can replay the first episode starting from the first feature or from the second feature. If the player does not wish to play any feature of the first episode, the player starts playing a second episode.

Optionally, the player knows whether one or more game-enhancement parameters are included in the selected feature before making his or her selection. Thus, the player may select to replay the first feature of the first episode based on a favorite game-enhancement parameter that is made available. For example, if the player is aware that the first feature has a wild reels game-enhancement parameter and that the second feature has a spin multiplier game-enhancement parameter, the player may select the first feature (as opposed to the second feature) simply because the player's favorite game-enhancement parameter is the wild reels game-enhancement parameter.

Figure 4:
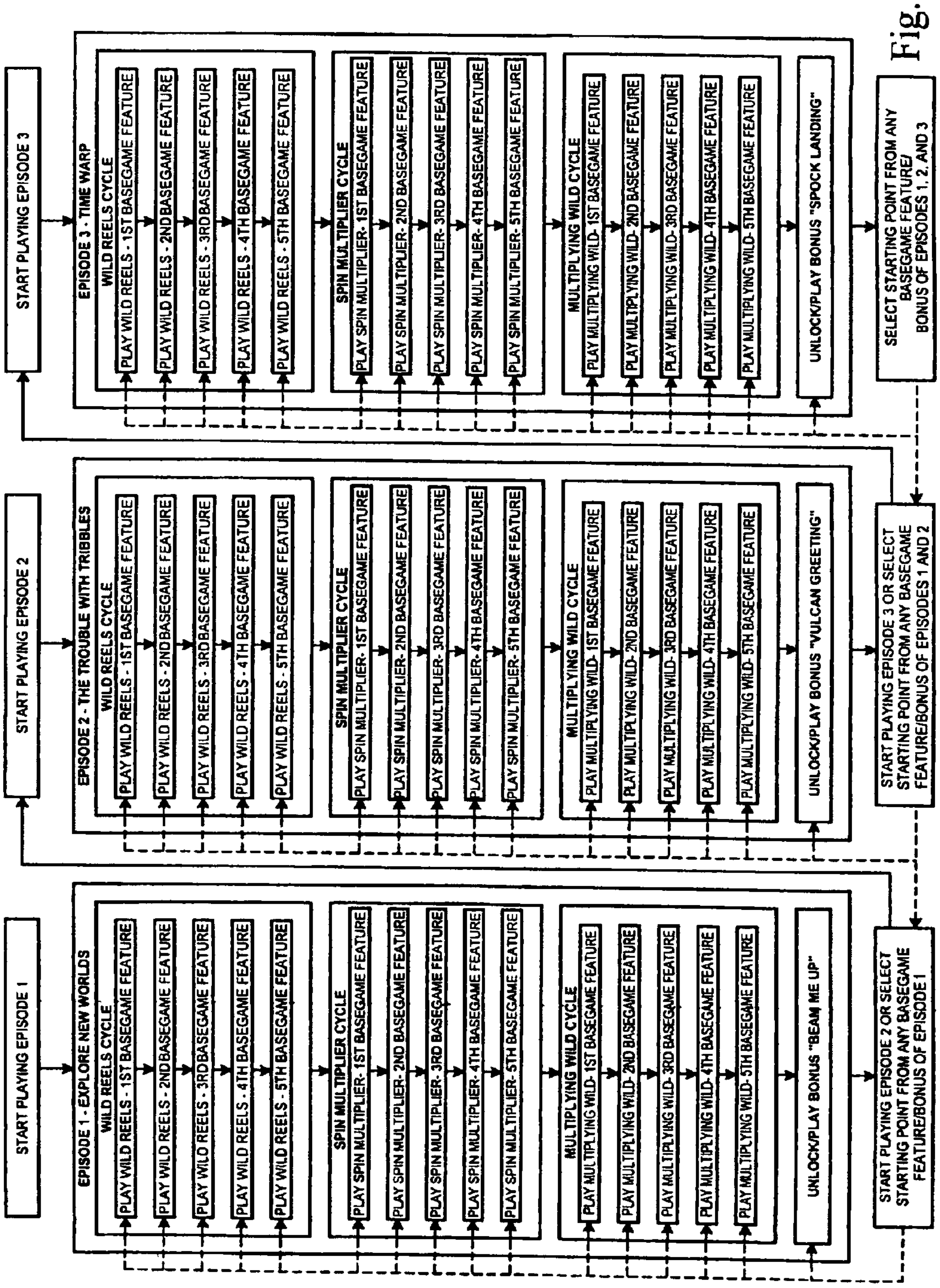
FIG. 4 is a detailed schematic representation of conducting an episodic wagering game, according to an alternative embodiment of the invention.

Referring to FIG. 4, a player conducts a Star Trek™ themed episodic wagering game having three episodes, including Episode 1 (titled "Explore New Worlds") Episode 2 (titled "The Trouble With Tribbles") and Episode 3 (titled "Time Warp"). Each episode includes three cycles of features, each of which has associated game enhancement parameters, including a "Wild Reels Cycle," a "Spin Multiplier Cycle," and a "Multiplying Wild Cycle," and, further, each cycle includes five missions ($1^{st}$ Basegame Feature-$5^{th}$ Basegame Feature). In addition, each episode includes a bonus game that is unlocked only after each of the three cycles are completed for the respective episode. Specifically, Episode 1 includes a "Beam Me Up" bonus, Episode 2 includes a "Vulcan Greeting" bonus, and Episode 3 includes a "Spock Landing" bonus.

The player starts playing Episode 1 and plays the $1^{st}$ Basegame Feature of the "Wild Reels Cycle." When the player completes all five missions of the "Wild Reels Cycle," (i.e., has achieved five of these game enhancement parameters), the wagering game enables the "Spin Multiplier Cycle" and the player now plays the five missions in this cycle. After completing all five missions in the "Spin Multiplier Cycle," the player is now able to play the five missions of the "Multiplying Wild Cycle." Finally, the player completes Episode 1 after playing the "Beam Me Up" bonus.

In an alternative embodiment, in addition to merely playing a particular Basegame Feature, the player is required to obtain a particular result to enable the next Basegame Feature. For example, the player is required to win at least 1 credit while playing the $1^{st}$ Basegame Feature of the "Wild Reels Cycle" before enabling the $2^{nd}$ Basegame Feature.

Optionally, instead of progressing sequentially (or linearly) through each of the episode missions, the player may play sequentially a Basegame Feature from each episode until all the missions have been completed. For example, the player plays in order the $1^{st}$ Basegame Feature of the "Wild Reels Cycle," the $1^{st}$ Basegame Feature of the "Spin Multiplier Cycle," the $1^{st}$ Basegame Feature of the "Multiplying Wild Cycle," the $2^{nd}$ Basegame Feature of the Wild Reels Cycle," etc. Thus, the episodic wagering game can progress using any combination of episodes, cycles, features, and bonuses.

In another exemplary embodiment, the player is required to complete an episode and/or associated features in a non-linear fashion. Thus, the player may be required to select one or more of a plurality of non-linear episodes and/or a plurality of non-linear features before moving on to another portion of the wagering game. For example, the wagering game can include a number of rooms, each having one or more clues that may be used to solve a murder mystery. The player can move from room to room by collecting a predetermined number of clues within each room. Although the player can choose in which room and in what order he or she progresses through the wagering game, the player may be prevented from moving to a next room until he or she has found a predetermined number of clues in the particular room. After solving the murder (e.g., completing the episode), the player would have the option to revisit any of his or her favorite rooms (and the respective features).

When the player completes Episode 1, the player has the option to start playing Episode 2 or to manually select a starting point from any Basegame Feature or bonus of Episode 1. For example, if the player particularly enjoyed the 3$^{rd}$ Basegame Feature of the "Spin Multiplier Cycle," the player can select that starting point for game play. After playing the 3$^{rd}$ Basegame Feature of the "Spin Multiplier Cycle" for the second time, the player can either continue progressing linearly through Episode 1 (i.e., playing 4$^{th}$-5th Basegame Features of the "Spin Multiplier Cycle," the 1$^{st}$-5$^{th}$ Basegame Features of the "Multiplying Wild Cycle," and the "Beam Me Up" bonus) or can start playing Episode 2. Alternatively, the player does not have the option to start playing Episode 2 if the player has selected to replay a particular Basegame Feature of Episode 1.

According to an alternative embodiment of the present invention, if each Basegame Feature of a particular cycle is generally identical, the player can manually select as a starting point only the 1$^{st}$-5$^{th}$ Basegame Feature of a respective cycle. For example, if each of the 1$^{st}$-5$^{th}$ Basegame Features of the "Spin Multiplier Cycle" are identical, the player can only select as a starting point the respective 1$^{st}$ Basegame Feature.

If the player selects to start playing Episode 2, the player progresses through Episode 2 similarly as in Episode 1. Thus, the player plays each Basegame Feature and bonus of Episode 2. When the player completes Episode 2, the player has the option to start playing Episode 3 or to select a starting point from any Basegame Feature or bonus of Episodes 1 and 2.

If the player selects to start playing Episode 3, the player progresses through Episode 3 similarly as in Episodes 1 and 2. When the player completes Episode 3, the progression through the wagering game is complete and the player has the option to select a starting point from any Basegame Feature or bonus of Episodes 1, 2, and 3.

According to an alternative embodiment, the player can manually select to replay any previously played feature at any time. For example, while playing the 1$^{st}$ Basegame Feature of the "Spin Multiplier Cycle" the player decides that he or she wants to play the 4$^{th}$ Basegame Feature of the "Wild Reels Cycle." The player can interrupt game play of the 1$^{st}$ Basegame Feature of the "Spin Multiplier Cycle" and manually select to play the 4$^{th}$ Basegame Feature of the "Wild Reels Cycle." Alternatively, the player can use the manual selection option only during a predetermined time. For example, the player may not be able to interrupt a current Basegame Feature (e.g., the 4$^{th}$ Basegame Feature of the "Wild Reels Cycle") but, instead, the player must wait until concluding the particular current Basegame Feature, cycle, or episode before being able to make the manual selection.

Figure 5:
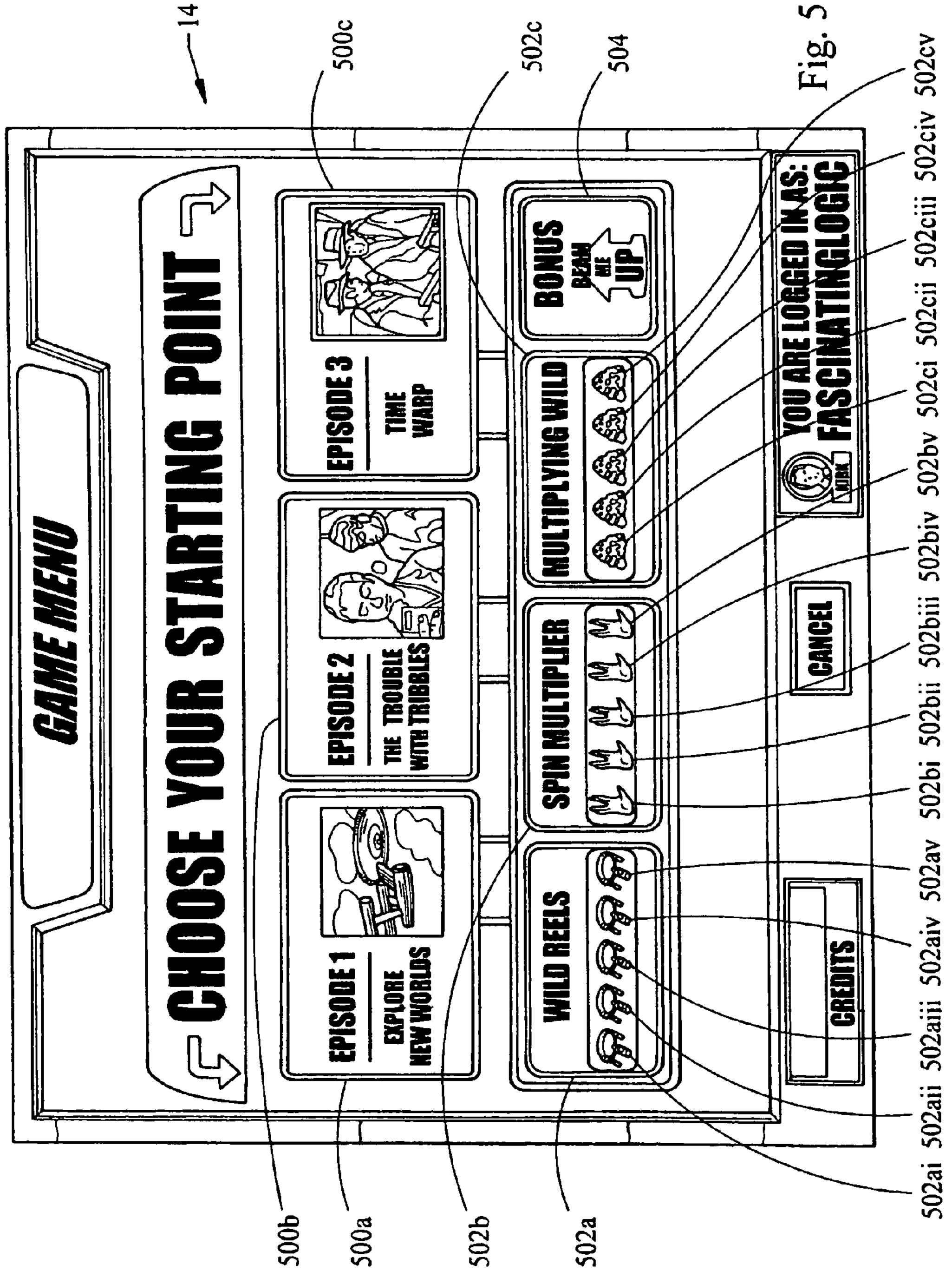
FIG. 5 is a representation of a display showing a selectable start point for a player of an episodic wagering game, according to yet another alternative embodiment of the invention.

Referring to FIG. 5, the primary display 14 shows a "Game Menu" screen that is used by the player to manually select a starting of the episodic wagering game described above in reference to FIG. 4. The primary display 14 includes selectable episode icons 500*a*-500*c*, selectable cycle icons 502*a*-502*c*, selectable Basegame Feature icons 502*ai*-502*cv*, and a selectable bonus icon 504. Upon enabling a next episode, the choose his or her starting point from a previously played episode. Thus, assuming that the player has completed all three episodes of Episode 1-Episode 3, the player can touch the appropriate icon to start replaying a particular portion of the wagering game. For example, the player can select Basegame Feature icon 502*bv* to replay the 5$^{th}$ Basegame Feature of the "Spin Multiplier Cycle" of Episode 2 ("The Trouble With Tribbles").

According to an alternative embodiment, the player is required to complete only a particular percentage of features before the player is allowed to play another episode and/or to replay a specific previously played game feature. For example, the player may be required to play and/or complete fifty percent of the total number of features of the episode before being allowed to select a starting point from previously played game features.

Each of these embodiments and obvious variations thereof is contemplated as falling within the spirit and scope of the claimed invention, which is set forth in the following claims.

What is claimed is:

1. A gaming machine for playing a wagering game, comprising:

a game display operable to display a randomly selected outcome of a wagering game in response to receiving a wager from a player, the wagering game having a game-play progression that includes a plurality of game episodes, at least one of the plurality of game episodes having a plurality of episode missions; and a controller in communication with the game display and programmable to cause, in response to a manual selection received from the player, the start of the wagering game from any previously played mission of the plurality of episode missions.

2. The gaming machine of claim 1, wherein at least one game episode of the plurality of game episodes includes a bonus episode mission.

3. The gaming machine of claim 2, wherein the bonus episode mission is available for play after the player has linearly progressed through each episode mission of the at least one game episode.

4. The gaming machine of claim 1, wherein a next one of the plurality of game episodes is available for play only after an initial one of the plurality of game episodes has been completed.

5. The gaming machine of claim 1, wherein a manual selection option is displayed on the game display and is available to the player at any time during the wagering game.

6. The gaming machine of claim 1, wherein a next episode of the plurality of game episodes is available for game play after the player has played a certain percentage of plurality of episode missions of the at least one of the plurality of game episodes.

7. The gaming machine of claim 1, wherein at least one of the plurality of episode mission has one or more game-enhancement parameters.

8. The gaming machine of claim 7, wherein the one or more game-enhancement parameters are known to the player when the player inputs the manual selection to replay a respective episode mission of the plurality of episode missions having a favorite game-enhancement parameter of the one or more game-enhancement parameters.

9. A method of conducting a wagering game, comprising:

receiving a wager input from a player, via an input device, for playing a wagering game having a game-play progression that includes a plurality of game episodes;

selecting, by one or more controllers, at least one randomly selected outcome of a plurality of outcomes in response to the receiving step;

displaying the randomly selected outcome on a game display device;

completing, by at least one of the controllers, a game episode of the plurality of game episodes in response to completing all episode missions of the game episode; and providing, by at least one of the controllers, the player with a manually selectable start point for playing the wagering game, the start point being selectable from any episode mission of a prior completed game episode of the plurality of game episodes.

10. The method of claim 9, further comprising displaying a plurality of selectable start points on the game display device of a gaming machine.

11. The method of claim 9, wherein episode features of at least one of the plurality of game episodes include one or more bonus missions.

12. The method of claim 9, wherein the selectable start point is available to the player only when the player has completed an episode mission.

13. The method of claim 9, wherein at least one of the plurality of episode missions has one or more game-enhancement parameters.

14. The method of claim 13, further comprising displaying the one or more game-enhancement parameters to the player before the player selects the start point.

15. A computer-readable storage medium encoded with instructions for directing a gaming machine perform the method of claim 9.

16. A method for playing a wagering game, comprising:

using at least one input device to accept a wager input;

in response to receiving the wager input, sending to one or more processors a signal indicative of a wager to play a wagering game having an episodic game-play progression;

using at least one of the processors to execute one or more game programs stored in one or more computer readable storage mediums, the execution of at least one of the game programs initiating the wagering game on a gaming machine;

using at least one of the processors to select at least one randomly selected outcome of a plurality of outcomes;

using at least one of the processors to cause at least one display device to display an initial Basegame Mission and one or more subsequent missions of a game episode;

using the input device to receive player inputs for completing the game episode by playing the one or more subsequent missions of the game episode; and in response to completing the game episode, using at least one of the processors to provide a player selectable start point selected from any Basegame Mission of the game episode, including the initial Basegame Mission and the one or more subsequent missions.

17. The method of claim 16, further comprising using the input device to receive player inputs for playing a bonus round before completing the game episode.

18. The method of claim 16, wherein at least one of the processors provides the selectable gameplay start point to be selected from an initial Basegame Mission of a next episode.

19. The method of claim 16, further comprising using at least one of the processors to cause the at least one display device to display the selectable gameplay start point, the selectable gameplay start point being available to the player at any time during a wagering session.

20. The method of claim 16, wherein the one or more processors includes a plurality of processors, a first one of the processors residing inside a housing of the gaming machine and a second one of the processors being located remotely from the gaming machine, the first one of the processors and the second one of the processors being in communication via a network.

* * * * *